United States Patent
Jacquemont et al.

(10) Patent No.: US 6,991,378 B2
(45) Date of Patent: Jan. 31, 2006

(54) DEVICE FOR IMPROVING THE LUBRICATION OF BEARINGS, PARTICULARLY IN WIND TURBINES

(75) Inventors: Eric Jacquemont, Clisson (FR); Germain Errard, Clisson (FR)

(73) Assignee: S.A. Defontaine, (FR)

( * ) Notice: Subject to any disclaimer, the term of this patent is extended or adjusted under 35 U.S.C. 154(b) by 96 days.

(21) Appl. No.: 10/188,739

(22) Filed: Jul. 2, 2002

(65) Prior Publication Data

US 2003/0048963 A1   Mar. 13, 2003

(30) Foreign Application Priority Data

Jul. 6, 2001   (FR)   ................... 01 09029

(51) Int. Cl.
*F16C 33/06*   (2006.01)
*F03D 11/00*   (2006.01)

(52) U.S. Cl. .................. 384/471; 384/473; 384/475; 416/132 B; 416/174; 416/205

(58) Field of Classification Search ............... 384/462, 384/471, 473, 474, 475; 185/5.1; 416/131, 416/132 B, 146 A, 174, 205
See application file for complete search history.

(56) References Cited

U.S. PATENT DOCUMENTS

| | | | | |
|---|---|---|---|---|
| 1,835,877 A | * | 12/1931 | Joyce | 384/473 |
| 2,280,659 A | * | 4/1942 | Muller | 384/475 |
| 3,007,751 A | | 11/1961 | Eenink | |
| 3,303,898 A | * | 2/1967 | Bercaru | 175/228 |
| 3,489,471 A | * | 1/1970 | Kelley | 384/473 |
| 3,637,270 A | * | 1/1972 | Johnson | 384/471 |
| 3,749,459 A | * | 7/1973 | Matuzaki et al. | 384/473 |
| 3,844,364 A | * | 10/1974 | Crow | 175/228 |
| 3,866,716 A | * | 2/1975 | Matson | 184/14 |
| 3,940,191 A | | 2/1976 | Tomioka et al. | |
| 4,577,705 A | | 3/1986 | Cross | |
| 4,668,109 A | | 5/1987 | Basso | |
| 4,668,168 A | * | 5/1987 | Schilder et al. | 416/157 R |
| 4,722,616 A | | 2/1988 | Lederman | |
| 4,778,285 A | | 10/1988 | Larson | |
| 5,048,981 A | * | 9/1991 | Ide | 384/607 |
| 5,246,087 A | * | 9/1993 | Schipper | 184/5 |
| 5,423,399 A | * | 6/1995 | Smith et al. | 184/5.1 |
| 5,441,120 A | | 8/1995 | Dysart | |
| 5,484,212 A | | 1/1996 | Guaraldi et al. | |
| 5,620,060 A | * | 4/1997 | Bialke | 184/104.1 |
| 5,749,660 A | * | 5/1998 | Dusserre-Telmon et al. | 384/475 |

FOREIGN PATENT DOCUMENTS

| | | |
|---|---|---|
| DE | 44 32 986 | 11/1995 |
| GB | 2 055 154 | 2/1981 |

* cited by examiner

*Primary Examiner*—William C Joyce
(74) *Attorney, Agent, or Firm*—Bachman & LaPointe, P.C.

(57) ABSTRACT

For a bearing mounted between two concentric races rotating relative to each other, and forming an annular gap that accommodates the bearing and is closed by seals, at least one grease tube is provided between the periphery of one of the two races and the annular gap, and is connected to a corresponding grease reservoir. At least one main grease tube opens into the annular gap in an angular sector where an overpressure occurs, a corresponding main grease reservoir is adapted to collect grease flowing from the annular gap through the main grease tube due to the overpressure that may occur within the annular gap in the angular sector.

19 Claims, 2 Drawing Sheets

DEVICE FOR IMPROVING THE LUBRICATION OF BEARINGS, PARTICULARLY IN WIND TURBINES

BACKGROUND OF THE INVENTION

The present invention relates to a device for improving the lubrication of ball or roll bearings.

In particular, although not exclusively, it applies to the orientation races of orientable blades in wind turbines having a rotor, the rotational axis of which is permanently oriented substantially along the wind direction. More generally, it applies to any turbine with orientable blades, which is driven by a fluid with its rotational axis parallel to the fluid's flow direction, as well as any bearing used under comparable conditions.

Such wind turbines are generally mounted on top a mast and comprise a stator attached so as to be rotatable about the mast axis and thus, to be oriented according to the wind direction, and a rotor supporting a number of blades. For the rotational velocity of the rotor to be controlled and, particularly, so that it does not exceed a certain limit, the blades are pivotally mounted on the rotor so as to be rotatable about their longitudinal axis.

To that purpose, the stator, as well as the blades, are mounted on sets of concentric ball or roll bearing races, wherein each set comprises a support race considered to be fixed, a moving race rotating within the fixed race, and a ball or roller bearing intermediate the fixed race and the moving race, in order to reduce friction between the moving race and the fixed race.

However, such bearings undergo a number of stresses. Since the wind turbine is exposed to whether stresses, these must be protected within sealed housings, especially as they undergo relatively little rotation. Therefore, it is necessary to use seals, for example of the ring type with lips, and to ensure proper bearing lubrication by grease retained by said seals within said housings.

It has been found that blade orientation races, due to their position on the wind turbine and the forces transmitted to the blades, undergo asymmetrical stresses. As these races are always exposed to the wind in the same direction, which is the rotor axis direction and which is therefore parallel to the radial direction of their plane, it is found that with time, the grease will not be distributed uniformly within the bearing along the periphery of the races, but will tend to follow the wind by accumulating on the side not exposed to wind.

Furthermore, the blade orientation races undergo strong mechanical stresses resulting from the flexural moment transmitted to the bearings by the blades, which are arranged perpendicular to the wind direction. This causes a relative movement, other than their rotation, of both races relative to each other.

The moving races also undergo centrifugal forces caused by the rotation of the rotor and blades, which also influence the distribution of grease within the bearing.

These asymmetrical mechanical stresses influence the distribution of grease within the bearings and generate overpressures causing grease leakage through the seals, which are not designed to undergo such pressures.

This causes non-optimal lubrication of bearings and affects the lifetime of races, so that they must be replaced relatively often.

As a consequence, it is necessary to carry out relatively frequent maintenance operations, in particular for cleaning the parts of the wind turbine that are soiled by grease having escaped from the bearings, and to re-inject grease within the latter through openings formed in the fixed races. These drawbacks strongly affect the operating cost of such wind turbines.

The present invention aims at overcoming these drawbacks. It relates to a device for improving the lubrication of a bearing mounted between two concentric races, which swivel, i.e. rotate, about their common axis relative to each another, and bound an annular gap that accommodates the bearing, is filled with grease and is closed by seals, at least one grease tube being provided between the periphery of one of the two races and said annular gap, and being connected to a respective grease reservoir.

Such a device is described, for example, in GB-A-2 055 154.

SUMMARY OF THE INVENTION

According to the present invention, the above-mentioned device is characterized in that, while the moving race is subject to asymmetrical stresses essentially directed towards one region of the fixed race, at least one main grease tube opens into the annular gap in a main angular sector surrounding said region, and in that a corresponding main grease reservoir is adapted to collect the grease flowing from the annular gap through said main grease tube due to an overpressure that may be present within the annular gap in said angular sector.

According to this invention, such a device for improving the lubrication of a bearing may be mounted in orientation races for orientable blades of a wind turbine comprising a mast, a stator pivotally mounted on the mast through a set of bearing races and a rotor supporting the blades, wherein the stator and the rotor are oriented so that the rotational axis of the rotor is permanently oriented substantially along the wind direction, wherein the blades are mounted on the rotor so as to be rotatable about their longitudinal axis through a set of bearing races, each set of races comprising two concentric races rotating relative to each other and bounding the above-described annular gap.

According to a preferred embodiment, the above-mentioned device includes at least one complementary grease tube opening into the annular gap, in a complementary angular sector which is substantially diametrically opposed to the main sector, and each complementary grease tube is connected to a corresponding complementary reservoir adapted to distribute the grease within the annular gap.

Moreover, since the grease tends to accumulate in at least one determined angular sector of said annular gap, the reservoirs located adjacent said annular sector are mounted in an empty state and adapted to collect excess grease and/or overpressure air from said angular sector, and the reservoirs located in the complementary angular sector opposed to said main angular sector are mounted in a state filled with grease, and are adapted to inject grease into said annular gap; ducts may connect the grease tubes and/or the reservoirs together and may be equipped with means for transferring the excess grease from said main angular sector to the opposed complementary angular sector via these ducts.

Each reservoir is deformable and, in particular embodiments, may comprise bellows allowing to be deformed; it may be made of a pocket of flexible material.

As a consequence, the reservoirs according to the present invention may compensate for variations and volume displacements of grease, but also of air, contained within the race depending on the pressure changes which may occur, as explained above, but also according to temperature, wear, etc. In particular, as the complementary grease reservoirs located on the windward side then tend to become empty, they inject grease into the under-lubricated areas, whereas the main grease reservoirs located downstream relative to the wind tend to become replenished, thus absorbing air and grease overpressures. The grease pressure within the bearing is therefore regulated and distributed more uniformly over the entire circumference of the races, while avoiding any possible overpressure that might not be withstood by the seals. As a result, grease leaks through the seals are almost entirely suppressed.

By placing and mounting filled grease reservoirs on the windward side and empty reservoirs on the leeward side, the bearings are thus lubricated optimally over a long time period. The lifetime of the races is therefore highly increased.

Furthermore, according to the invention, it is possible to strongly reduce not only the frequency of maintenance operations, but also their duration, since it is no longer necessary to clean the grease leaks.

BRIEF DESCRIPTION OF THE DRAWINGS

An embodiment of the invention will now be described by way of example only and with reference to the accompanying drawings in which.

DETAILED DESCRIPTION OF THE PREFERRED EMBODIMENT(S)

Figure 1:
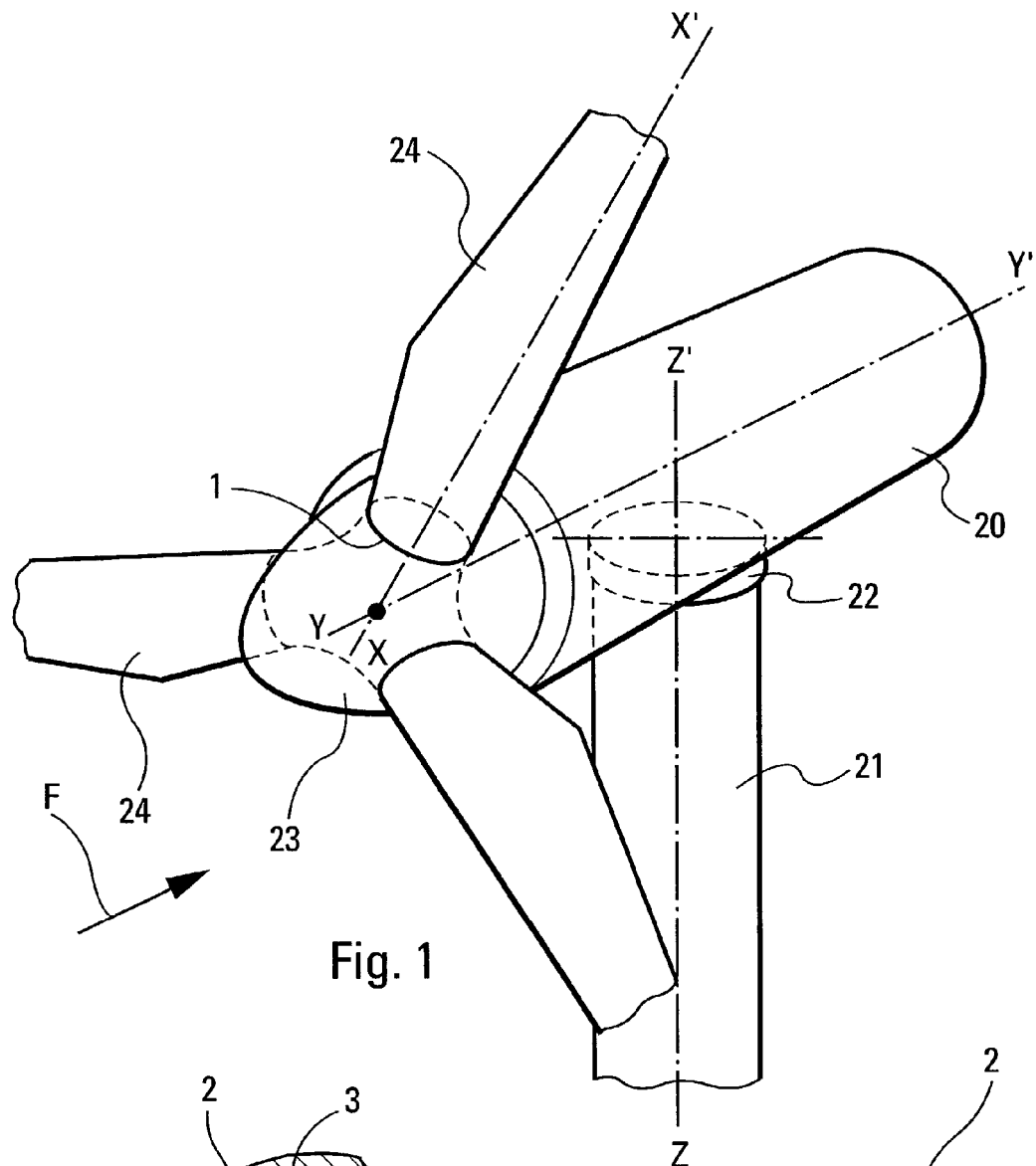
FIG. 1 is a schematic partial perspective view of a wind turbine adapted to be provided with a device according to this invention.

In FIG. 1, the wind turbine comprises a pod 20 rotatably mounted on a vertical mast 21 through a first set of bearing races 22 so as to be rotatable about a vertical axis zz' to be oriented according to the wind direction. The pod 20 is made integral with a stator within which is rotatably mounted a rotor 23 rotating about an axis yy'. Blades 24, for example three in number, are pivotally mounted on the rotor through a respective set of bearing races 1 so as to be rotatable about the blade's longitudinal axis xx'. Thus, the blade may be rotated about its axis in order to regulate the rotational velocity of the rotor as a function of wind velocity, and in particular, in order to maintain a substantially constant rotor rotational velocity irrespective of wind velocity.

Figure 2:
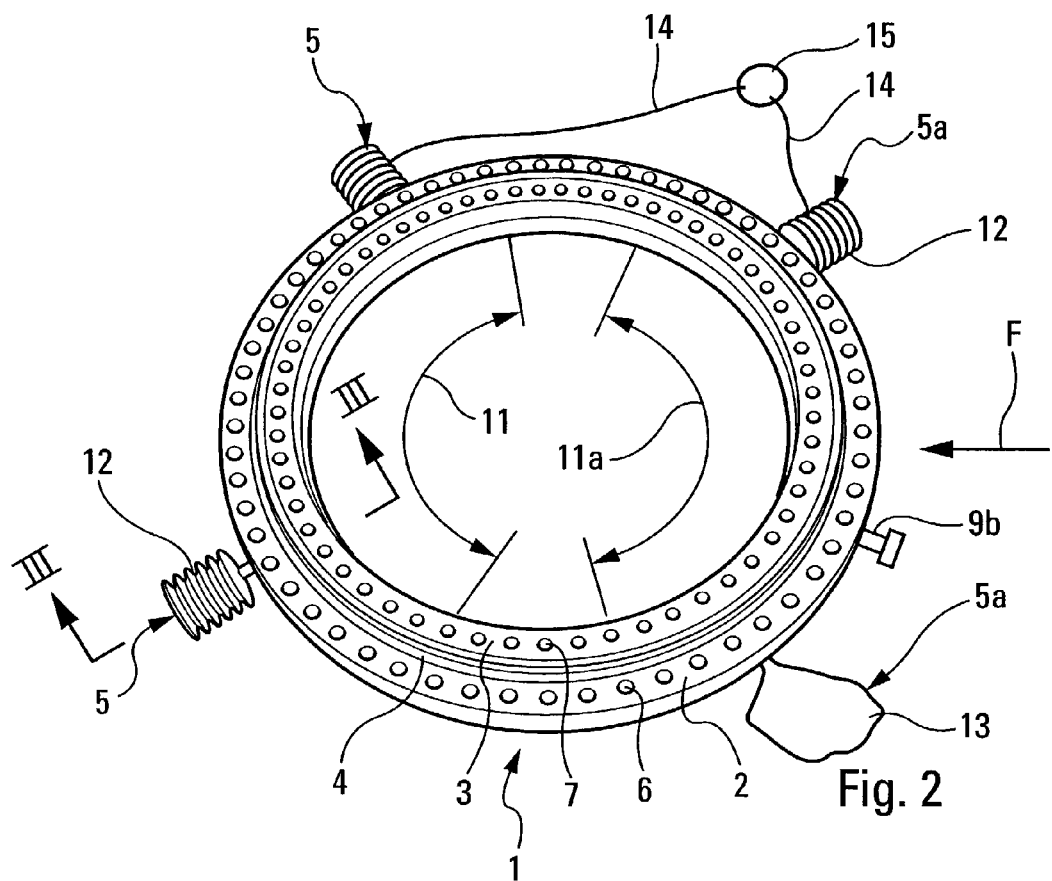
FIG. 2 is a schematic plane view of a set of orientation races of a wind turbine rotor blade equipped with a device according to one embodiment according to this invention.

FIG. 2 is a detailed view of a set of orientation races 1 for a blade 24 of the wind turbine rotor 23. This set comprises two concentric races 2, 3, namely an outer race 2 attached to the wind turbine rotor and a coaxial inner race 3, rotatably mounted within the outer race 2 and integral with blade 24. As shown in more detail in FIG. 3, the gap between the two races 2, 3 defines an annular gap 8 that accommodates a bearing, for example of the ball type, allowing friction to be reduced between both races when the inner race 3 rotates within the outer race 2. The bearing, which may be of any known type, is not shown for the sake of clarity.

The annular volume 8 of the ball or roll bearing is closed by upper and lower seals 4, 4'.

Both races 2, 3 further comprise a plurality of crosswise through holes 6, 7 uniformly distributed over their periphery, so that they may be fixed to the rotor and a blade, respectively. For example, seals 4, 4' may be lipped annular rings.

According to the present invention, as the moving race 3 is subject to strong asymmetrical stresses essentially directed along the wind direction, schematically shown by an arrow F in the Figures, towards a region R of the fixed race 2, at least one grease tube 9 opens into the annular gap 8 within an angular sector 11 that surrounds region R.

A corresponding reservoir 5 is adapted to collect grease flowing from the annular gap 8 through said tube 9 because of the overpressure that may occur within the annular gap 8 at said angular sector 11.

In the embodiment shown in the Figures, the device includes at least one complementary grease tube 9a opening into the annular gap 8, and a complementary angular sector 11a, which is substantially diametrically opposed to the main angular sector 11, and each complementary grease tube 9a is connected to a corresponding complementary reservoir 5a adapted to distribute grease into the annular gap 8.

The reservoirs 5, 5a, comprise a tubular opening 10 for example arranged to be fitted in sealing engagement into a corresponding lubricating tube 9, 9a.

These are preferably deformable so as to be filled with, or emptied of grease without generating counter-pressures, the annular gap 8 being substantially at atmospheric pressure.

Figure 3:
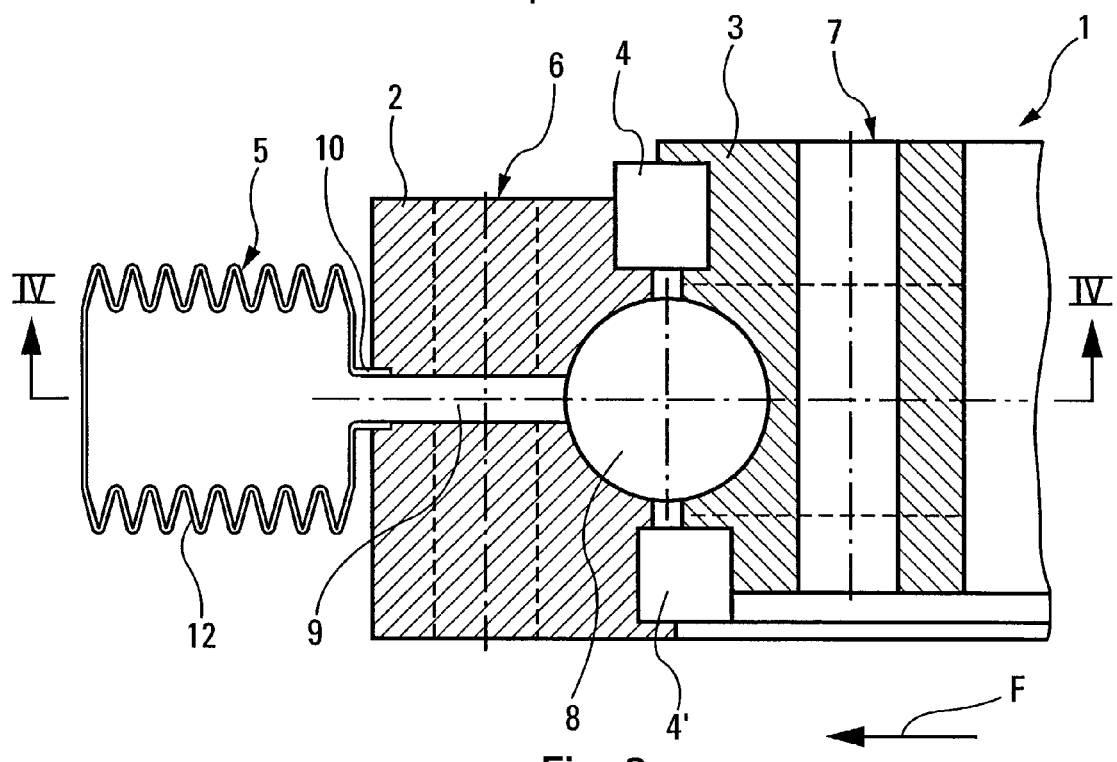
FIG. 3 is a partial enlarged cross-sectional view along line III—III of FIG. 2.

They may be made of a rigid material and be provided with at least one bellows 12, as shown in FIGS. 2 and 3, so as to be deformable.

They may also be made of a deformable material, for example, a pocket 13 of a flexible material such as a plastic film.

Advantageously, reservoirs 5 filled with grease are provided at the lubricating points which are located on the windward side and the empty reservoirs 5a are placed at lubricating points arranged on the leeward side. Thus, as long as the windward reservoirs 5 are not entirely empty and the leeward reservoirs 5a are not entirely filled, the distribution of grease within volume 8, as well as its pressure, is substantially uniform within the entire annular gap 8. Thus, only a sufficient number of maintenance operations need to be ensured so as to replace empty reservoirs with filled ones and vice versa, and possibly for slightly replenishing the filled reservoirs with grease so as to compensate for the small losses which would not be entirely suppressed by the inventive device.

The lubrication operations take little time as they only require reservoirs 5, 5a to be replaced.

Alternatively, at least one main grease reservoir 5 may be connected to at least one complementary grease reservoir 5a, or the lubricating tubes 9, 9a may be connected directly, through an external duct, schematically shown at 14 in FIG. 2, on which a pump 15 is mounted for transferring grease from grease accumulation areas towards grease-poor areas. Of course, the pump is not required to work permanently, but only sufficiently often to avoid the overpressures occurring within the leeward angular sector to cause any grease leak through seals 4, 4', when the reservoirs 5 located downstream relative to the wind direction are filled-up. In this way, the maintenance operations may still be further spaced apart and may simply consist in compensating for grease losses. In this regard, as schematically shown in FIG. 2, the device further comprises at least one lubricating tube 9b provided between the periphery of one of the two races 2, 3 and the annular gap 8, and adapted to be connected to a lubricating device (not shown) for injecting grease into the annular gap 8 from outside.

Thus, there has been described a device for improving the lubrication of a bearing mounted between two concentric races, one of which rotates relative to the other one considered to be fixed, the rotating race being subject to asymmetrical stresses transmitted by the bearing to the fixed race.

Figure 4:
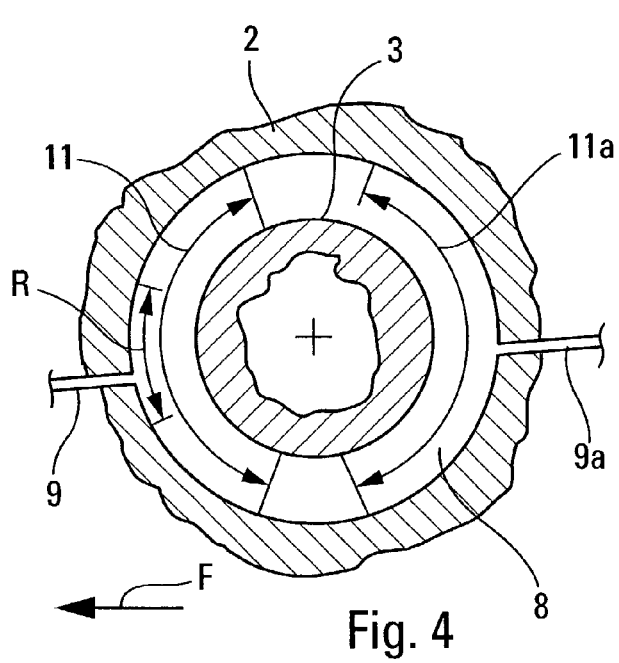
FIG. 4 is a partial cross-sectional view along line IV—IV of FIG. 3.

The device according to the present invention comprises at least one grease tube 9 connected to an initially empty reservoir 5. As schematically shown in FIG. 4, the single reservoir 5 is advantageously placed in a region R located substantially around a radius parallel to the wind direction F.

A single reservoir 5 is advantageously combined with at least one complementary reservoir 5a initially filled with grease. In the case of a single complementary reservoir 5a, said reservoir is advantageously provided at a position diametrically opposed to that of the main reservoir 5, as shown in FIG. 4.

In the embodiment shown in FIG. 2, the fixed outer race 2 comprises, for example, four grease tubes, namely two main grease tubes 9 each connected to a corresponding main reservoir 5, and two complementary grease tubes 9a each connected to a corresponding complementary reservoir 5a.

The main reservoirs 5 and the complementary reservoirs 5a may be arranged in any appropriate manner, along the circumference of the outer race 2. Advantageously, the two main reservoirs 5 are symmetrical to one another with respect to a diameter parallel to the wind direction, which also applies to both complementary reservoirs 5a, which may advantageously each be diametrically opposed to a corresponding main reservoir 5.

The angular sectors 11 and 11a may have any appropriate central angle.

In the embodiment of FIGS. 2 to 4, it has been assumed, as is conventional, that the outer race 2 is attached to the rotor 23, and that the inner race 3 rotates within race 2.

Figure 5:
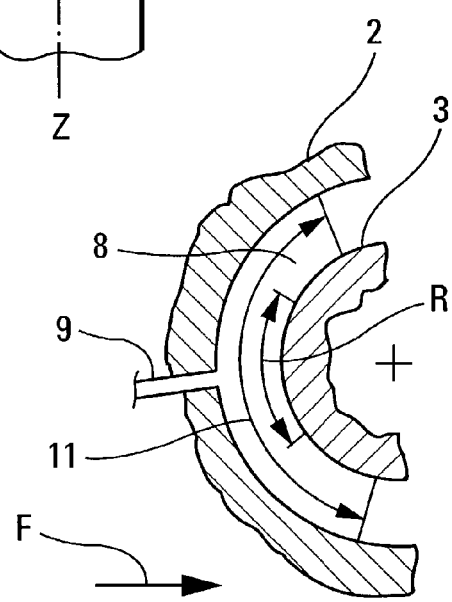
FIG. 5 is a view similar to FIG. 4 showing another embodiment according to this invention.

In the embodiment of FIG. 5, the inner race 3 is attached to the rotor 23 and the outer race 2 rotates about the inner race 3.

In this embodiment, the region R which mainly undergoes the asymmetrical stresses caused by the wind is a region of the inner race 3, and the main angular sector 11 liable to undergo overpressures is located upstream relative to the wind direction.

The main grease tubes 9 and complementary tubes 9a are advantageously formed within the race which is attached to the pod, but may also be formed within the race that rotates about the fixed race, as shown in FIG. 5.

It should be noted that the present invention is not restricted to the above described embodiments, and that many changes and modifications may be made thereto within the scope of the present invention.

What is claimed is:

1. A turbine driven by a fluid, comprising a stator, a rotor mounted on the stator so as to rotate about a rotational axis which is oriented substantially permanently along a direction of the driving fluid, and blades mounted on the rotor so as to rotate about a longitudinal axis of the blade through sets of bearing races, each set of bearing races comprising two concentric races rotating relative to each other, and forming an annular gap that accommodates the bearing, said annular gap being filled with grease and being closed by seals, a first race of the races attached to the blade being subject to asymmetrical stresses oriented along the direction of the driving fluid towards a main angular sector of a second race of the races, at least one main grease tube opening into the annular gap within said main angular sector, each said main grease tube being connected to a corresponding main grease reservoir for collecting grease flowing from the annular gap through said at least one main grease tube because of an overpressure occurring within the annular gap at said main angular sector and of a depression occurring within the annular gap at a complementary angle sector which is substantially diametrically opposed to said main angular sector, said main angular sector being either a downstream region if the inner one of the races is fixed to the blade, or an upstream region if an outer one of the races is fixed to the blade.

2. The turbine of claim 1, wherein said at least one main grease tube being placed in a region located substantially around a radius parallel to the wind direction.

3. The turbine of claim 1, further comprising two main grease tubes symmetrically arranged to one other with respect to the rotational axis.

4. The turbine of claim 1, further comprising at least one complementary grease tube opening into the annular gap within said complementary angular sector and each said complementary grease tube being connected to a corresponding complementary grease reservoir for distributing grease within the annular gap.

5. The turbine of claim 4, wherein said at least one complementary grease tube being placed in a region located substantially around a radius parallel to the wind direction.

6. The turbine of claim 4, further comprising two complementary grease tubes symmetrically arranged to one other with respect to the rotational axis.

7. The turbine of claim 4, further comprising ducts connecting together, said at least one complementary grease tube and said at least one main grease tube, and means for transferring excess grease from said main angular sector towards said complementary angular sector through said ducts.

8. The turbine of claim 7, wherein each said complementary grease reservoir and each said main grease reservoir is deformable.

9. The turbine of claim 7, wherein at least one of the complementary grease reservoir and the main grease reservoir includes at least one bellows so as to be deformable.

10. The turbine of claim 7, wherein at least one of the complementary grease reservoir and the main grease reservoir is made of a pocket of flexible material.

11. The turbine of claim 7, wherein each complementary grease tube and each main grease tube is realized through the outer one of the races which is fixed to the rotor.

12. The turbine of claim 1, further including a lubricating device connected to at least one lubricant tube for injecting grease into the annular gap.

13. The turbine of claim 1, further comprising a mast, said stator being rotatably mounted on said mast through a set of stator bearing races so that the rotational axis is oriented substantially permanently along the driving fluid direction, said set of stator bearing race comprising a second set of concentric races rotation relative to each other, and forming a second annular gap that accommodates a stator bearing, said second annular gap being filled with grease and being closed by seals.

14. The turbine of claim 13, wherein said two races of said set of stator bearing races includes a second fixed race and a second moving race, the second moving race being subject to asymmetrically stresses directed towards a second main region of the second fixed race, at least one additional main grease tube opening into said second annular gap within a second main angular sector surrounding said second main region and being connected to a corresponding additional main grease reservoir, for collecting grease flowing from the second annular gap through said at least one additional main grease tube because of an overpressure occurring within the second annular gap in said second main angular sector.

15. The turbine of claim 14, further comprising at least one additional complementary grease tube opening into the second annular gap in a second complementary angular sector substantially diametrically opposed to the second main angular sector, and each said additional complementary grease tube being connected to a corresponding additional complementary grease reservoir for distributing grease within the second annular gap.

16. The turbine of claim 15, further comprising additional ducts connecting together, said at least one additional complementary grease tube and said at least one additional main grease tube, and means for transferring excess grease from said second main angular sector towards the second complementary angular sector through said additional ducts.

17. The turbine of claim 16, wherein each said additional complementary grease reservoir and each said additional main grease reservoir is deformable and wherein at least one of the additional complementary grease reservoir and the additional main grease reservoir includes at least one bellows so as to be deformable.

18. The turbine of claim 16, wherein at least one of the additional complementary grease reservoir and the additional main grease reservoir is made of a pocket of flexible material.

19. The turbine of claim 14, further including a second lubricating device connected to at least one additional lubricant tube for injecting grease into the second annular gap.

* * * * *